United States Patent Office
3,176,560
Patented Apr. 6, 1965

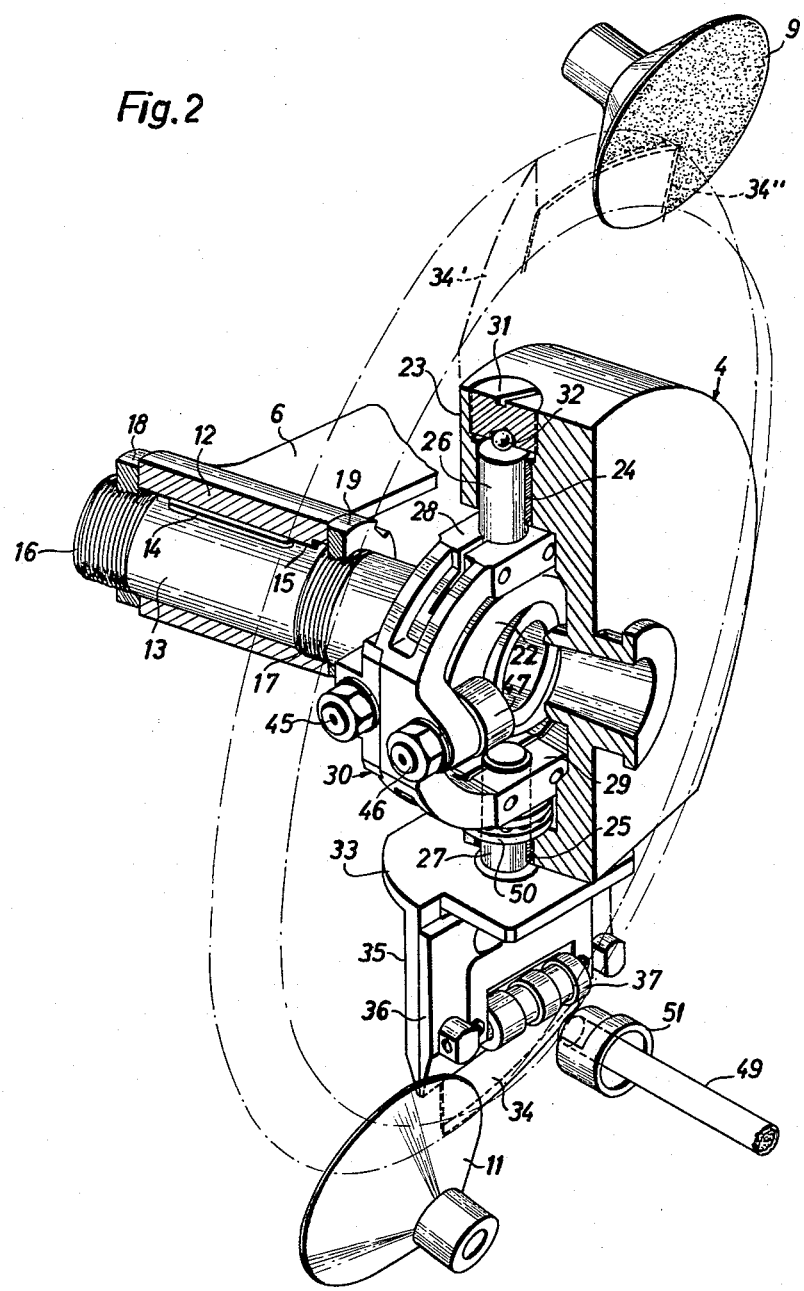

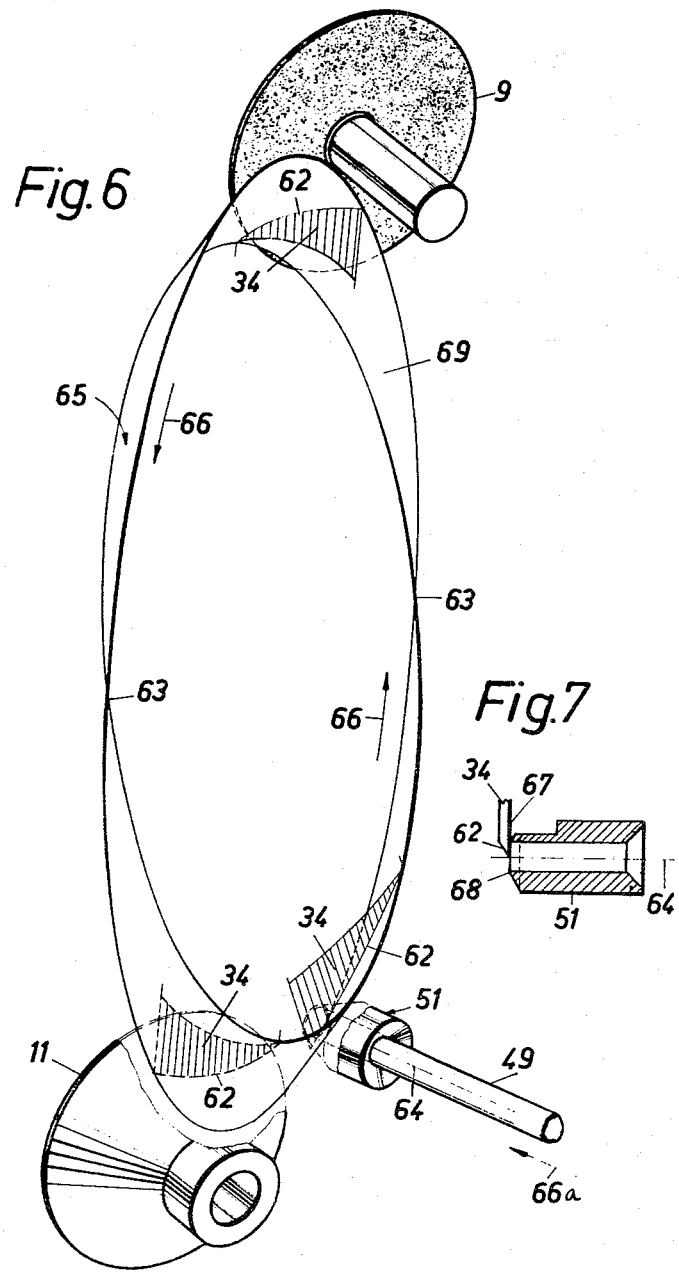

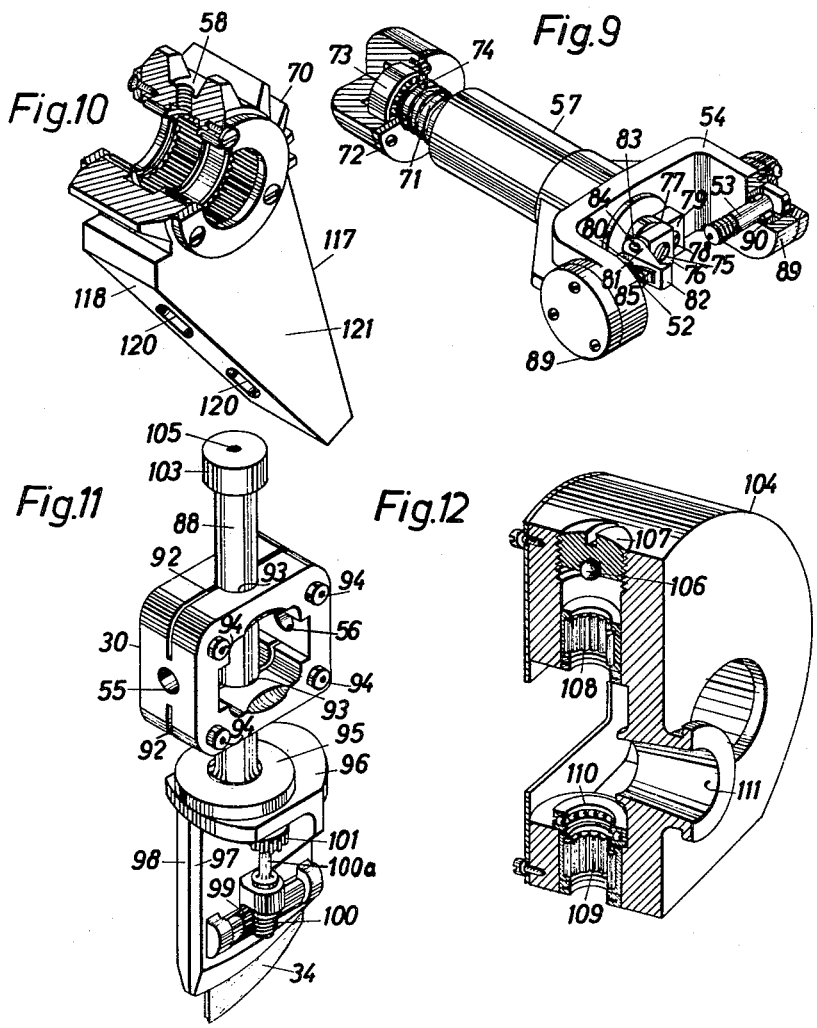

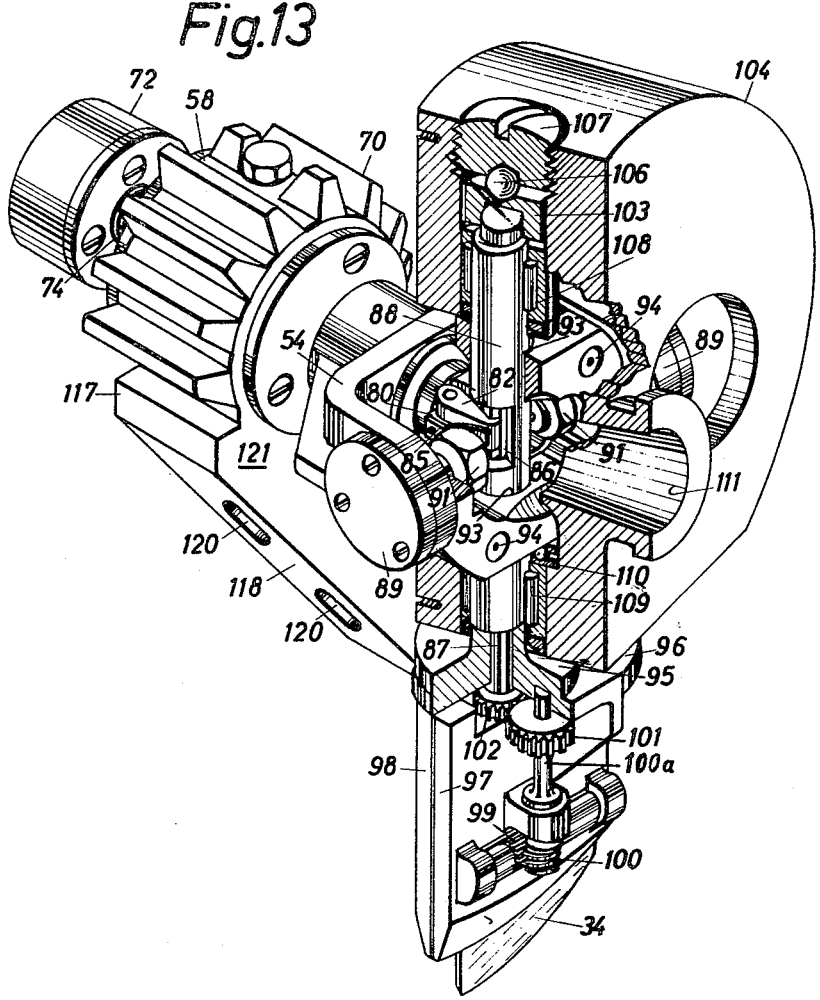

3,176,560
ORBITAL CUTTER CARRIER WITH CUTTER OSCILLATED BY ROTATION OF CARRIER AND TOOL SHARPENING MEANS IN PATH OF CUTTER MOVEMENT
Dietrich Bardenhagen, Hamburg-Lohbrugge, Germany, assignor to Hauni-Werke Körber & Co. K.G., Hamburg-Bergedorf, Germany
Filed Feb. 21, 1961, Ser. No. 90,772
Claims priority, application Germany, Nov. 29, 1960, H 38,763
13 Claims. (Cl. 83—174)

The invention relates to a device for cutting the continuously produced cigarette rod in a cigarette rod making machine. The cutting device is provided with a rotary curved cutting blade in which the cutting blade supporting shaft is inclined to the longitudinal axis of the cigarette rod and the inclination is adjustable in accordance with the length adjustment of the cigarettes to be cut from the cigarette rod.

In the known devices the curved cutting blade moves across the cutting tube approximately at right angles to the rod during the cutting operation. Owing to the inclined position of the cutting blade supporting shaft and the cutter carrier thereon, the latter executes a tumbling movement which is approximately in the direction of the cutting tube or of the rod movement in the region of the passage of the curved cutting blade through the cutting tube. The inclined position of the cutting blade carrier, however, involves an oblique position of the curved cutting blade with respect to the blade carrier in order that the aforesaid right angular position of the cutting blade with respect to the cigarette rod is maintained during its movement across the cutting tube.

For this purpose the curved cutting blade is arranged in a cutter holder which also embodies the desired adjustment means for the cutter advance, which holder is adjustable in the cutter support about a radial axis passing through the longitudinal symmetry axis of the curved cutter and is adapted to be fixed after pivotal adjustment. It is, however, necessary to grind the cutting blade at the side remote from the rod in order that the plane surface of the cutting blade may engage the adjoining end face of the cutting tube. In view of the inclined position of the cutting blade, a grinding or sharpening of the latter by means of a stationary grinding element is not possible, because the cutting blade would cut into the grinding tool. This solution of the problem which is satisfactory in itself, owing to the complicated construction and the liability to faults, has been replaced by a grinding tool carrier rotating in the same direction as the curved cutting blade and of which the axis of rotation is arranged parallel to the cutter axis and of which the grinding tool is brought into engagement with the cutting edge of the rotary curved cutting blade at every revolution, as disclosed in the German Patent No. 495,695. This arrangement has been used in principle up to the present day although the required adjustment of the grinding tool so as to secure a grinding action which maintains the desired curved form of the cutting blade is difficult and requires highly skilled operators. Moreover, the entire cutting apparatus becomes very large in size owing to the rotating grinding tools, quite apart from the considerable costs which are involved.

The invention overcomes these disadvantages by employing a stationary grinding tool and a cutting blade holder which is movable in pivotal oscillating manner about an axis extending radially to the axis of rotation of the cutter carrier. This adjustable oscillating construction of the cutter holder makes it possible to give this holder an inclined position in the region of the grinding tool which is opposite that in the cutting position so that an accurate grinding of the cutting blade to the necessary curved form is obtained with a stationary grinding tool.

In one form of the invention provision is made that the cutting blade holder is pivotally supported by means of a ring-shaped member about opposed pivots in the cutter carrier directed radially to the cutting blade supporting shaft. For adjusting the support member in this embodiment, the ring-shaped member is provided with two rollers which enclose between them a stationary cam disc arranged coaxially to the cutting blade supporting shaft. The cam disc is held by means of an axially adjustable hollow shaft in a holder mounted on the operating housing of the cutter support. There is mounted in the hollow shaft an operating spindle for performing the feed of the cutter in well known manner.

In another embodiment the adjustment of the ring-shaped member is obtained by pivotally connecting it to a fork having a central support spindle which is extended axially and is rotatable in a bearing directed toward the mid-point of the ring-shaped member, the axial extension being positioned at an angle to the cutting blade supporting shaft.

These two embodiments of the invention are shown by way of example and in diagrammatic form on the accompanying drawing, wherein:

FIG. 2 is a perspective view of part of the cutting device according to FIG. 1;

FIG. 6 shows the addendum envelope of the cutting edge;

FIG. 7 shows the cutting blade engaging the cutting tube;

FIGS. 9, 10, 11 and 12 show views of details, and

FIG. 13 shows the details of the FIGS. 9 to 12 assembled.

Figure 1:
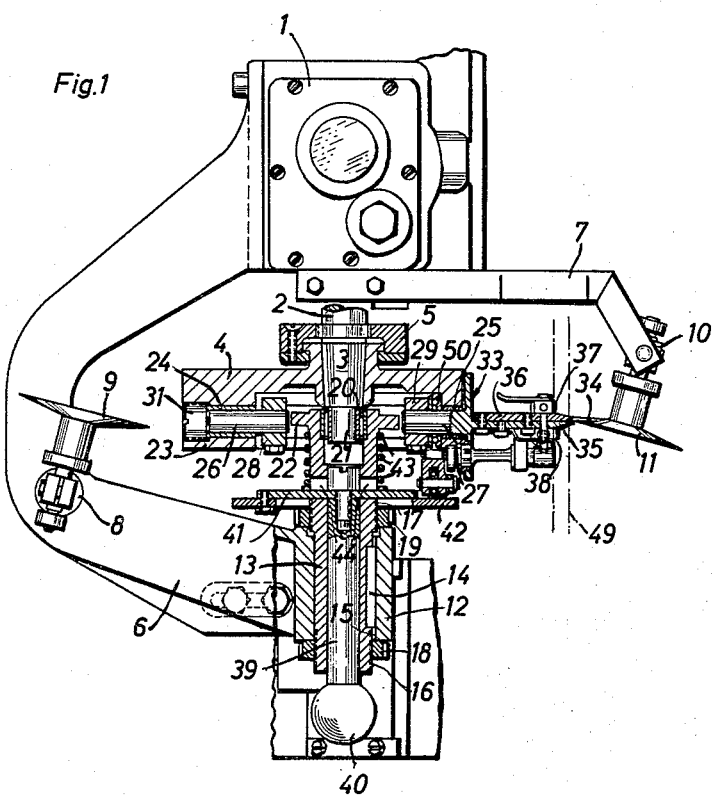
FIG. 1 is a plan of a cutting device according to the invention with the cam adjusting means shown partly in section.
Figure 3:
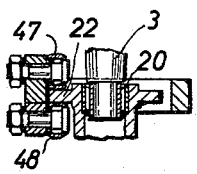
FIG. 3 shows the cam with the adjusting rollers in a sectional view.

Referring to the FIGS. 1 to 3, the cutting device consists of a pivotally movable casing 1 which is adapted to be fixedly secured in the desired position and serves as a bearing for the cutting blade carrying shaft 2. A pivotal adjustment of the casing 1 is necessary for adjusting the inclination of the cutting blade carrier 4 with respect to the cigarette rod to be cut. A cone-shaped portion 3 of the cutter blade carrying shaft 2 has mounted thereon the cutting blade carrier 4 which is fastened by means of a clamping collar 5. Attached to one side of the casing 1 is a bifurcated holder 6 and on the other side an arm 7. The holder 6 carries in the region of its fork a lug 8 in which a grinding disc 9 is freely rotatably mounted. The bearing of the grinding disc 9 is adjustable in all directions and is adapted to be fixed after adjustment. At the outermost end of the arm 7 is provided a lug 10 in which a honing disc 11 is freely rotatable in the same way and is adjustable with its bearing and adapted to be fixed after adjustment. The end of the forked holder 6 is provided with a bearing 12 for a hollow spindle 13 (see also FIG. 2), which is axially adjustable in the bearing by means of a key 14 engaging a groove 15 provided in the bearing 12. The ends of the spindle 13 are provided with screw threads 16 and 17 for adjusting rings 18 and 19, respectively.

A bearing 20 is located in that portion of the hollow spindle 13 which extends into the cutting blade carrier 4 (see also FIG. 3) and has rotatably mounted therein a pin 21 of the cutting blade carrying shaft 2. The hollow spindle 13 also carries an actuating cam 22 externally at this end. An axial adjustment of the cam 22 is effected by means of the adjusting rings 18, 19 (see also FIG. 2).

The cutting blade carrier 4 is of cup shape as shown in FIG. 1. In the annular rim 23 of the carrier 4 are formed two radially directed opposed bearings 24, 25 in which pivot pins 26 and 27 are rotatably mounted (see FIG. 2) which in turn are firmly clamped in split clamp sleeves 28 and 29 of a ring-shaped member 30 mounted within the central recess of the cup-shaped carrier 4. Axial displacement of the pivot pin 26 is limited by a ball 32 at the outer end of the bearing 24 and an adjusting screw 31. The cutter holder 33 is attached to the outwardly directed end of the pivot pin 27. The cutting blade 34 is firmly clamped between a support surface 35 and a clamping plate 36 and can be advanced as it becomes worn by rollers 37, 38.

The adjusting mechanism required for this purpose is shown on FIG. 1 and consists of a manually operable rod 39 with a handle 40 and to which an actuating bar 41 is attached at the end nearest the cutting blade carrier 4. This bar 41 carries a control ring 42. A compression spring 43 placed around the hollow spindle 13 engages with one of its ends the bar 41 so that the said bar is displaceable by means of the rod 39, 40, since the bar 41 extends through slots 44 in the wall of the hollow spindle 13. This movement is transmitted in known manner to the control ring 42 and by the latter to a suitable ratchet or like intermittent drive to the roller 38 for advancing the cutting blade 34.

Two pins 45 and 46 are fastened in the ring-shaped member 30 (FIG. 2) and these pins have rollers 47 and 48 (see FIG. 3) rotatably mounted thereon. The rollers 47, 48 engage both sides of the cam 22 and are spaced one from the other by an amount which corresponds to the thickness of the cam with the minimum possible tolerance. The re-adjustment of the cutting blade 34 to a position at right angles to the cigarette rod 49 when the casing 1 is tilted is effected by releasing the clamping collar 29 and rocking the cutter holder to the required angular position. A ball bearing 50 mounted below the clamping collar 29 on the pivot pin 27 forms a counter bearing for the pressure of the adjusting screw 31 and the ball 32.

The operation of the device disclosed in the FIGS. 1 to 3 is as follows:

After adjustment of the housing 1 and thereby the inclination of the cutting blade carrier 4, the cutting blade 34 with its holder 33 is brought to the required inclined position by rotatably adjusting the pin 27. The adjustment must be effected so that the non-bevelled flat face of the cutting blade 34 is directed parallel to the end surface of the cutting tube 51 (FIG. 2) serving as the counter cutter during the movement of the blade 34 past said cutting tube.

This position is indicated in FIG. 2 by the dash and dotted line 34' adjacent the grinding disc 9. It will be noted that in this position the cutting blade 34 would cut into the grinding disc 9. During the movement from the cutting tube 51 up to the grinding disc 9 the ring-shaped member 30 and therewith the cutting blade is rocked by the cam 22 and the guide rollers 47 and 48 into the position indicated by the dash lines 34". In this position a correct grinding of the bevelled edge of the curved cutting blade 34 is possible while maintaining the desired curved shape of the blade. The shape of the curvature is determined by the inclined position of the grinding disc 9 which is adjustable in all directions. After grinding of the cutting blade 34 the latter is again pivoted back into its cutting position by the cam 22 and the guide rollers 47, 48. In this cutting position the cutting blade 34 moves past the honing disc 11 and the cutting operation is repeated.

Figure 4:
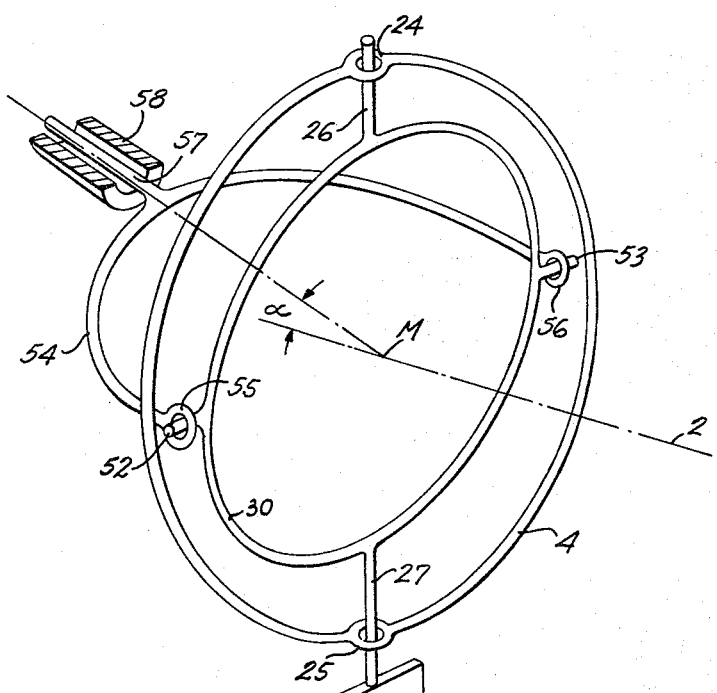
FIG. 4 shows diagrammatically the second embodiment using a rotating control fork.
Figure 5:
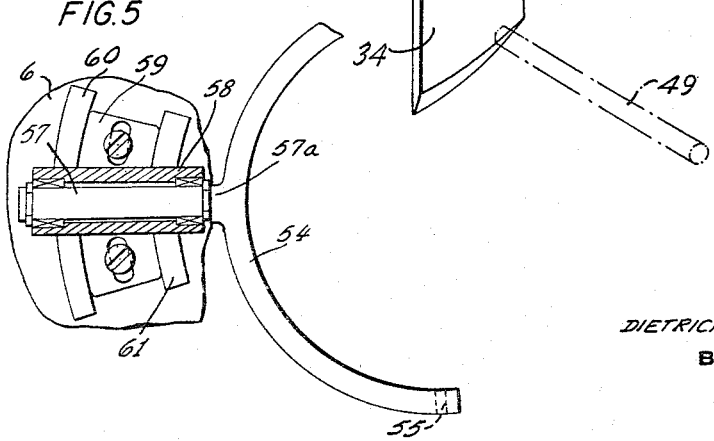
FIG. 5 is a plan view of an adjustable fork used in the device shown in FIG. 4 with the bearing shown in section.

In the embodiment of the invention disclosed in the FIGS. 4 and 5 the same or similar parts are provided with the same reference numerals as in the FIGS. 1 to 3. The cutting device consists of the cutting blade carrying shaft 2, the cutter blade carrier 4 with the radial bearings 24, 25, the ring-shaped member 30 with the pivot pins 26, 27 and the blade 34 arranged at one end of the pivot pin 27 for cutting the rod 49.

The adjusting means for the ring-shaped member 30 is constructed in the manner of a cardanic joint. For this purpose pivot pins 52 and 53 are attached to the ring-shaped member 30 in a position 90° displaced from the pivot pins 26 and 27, which pins 52 and 53 are rotatable in bearings 55 and 56 of a fork 54. A radially outwardly extending pivot pin 57 is attached to the central portion of the fork 54 and is rotatable in a stationary bearing 58 as shown in FIG. 5. A continuation of the axis of the bearing 58 or of the pin 57 intersects the longitudinal axis of the cutting blade carrying shaft 2, as shown in FIG. 4, at the center point M of the ring-shaped member 30. This axis of the bearing 58 forms with the longitudinal axis of the cutting blade carrying shaft 2 the required angle α.

The operation of this modified cutting device corresponds to that of the device described with reference to FIGS. 1 to 3. Also in this modification the holder for the cutting blade 34 oscillates backwards and forwards radially with respect to the shaft 2 about the axially aligned pivots 26 and 27. The arrangement of the ring member 30 to the cutting tube, the grinding wheel and the honing disc is such that the cutting, grinding and honing of the cutting blade are effected as far as possible at the reversal point of the oscillation of the cutting blade 34 resulting from the tumbling movement. Owing to the pivotal adjustment of the housing 1 (FIG. 2) as required by reason of the changes in the length of the rod pieces, the angle α at the stationary bearing 58—i.e. the member attached to the machine frame—may be varied in the desired direction.

The bearing 58 shown in FIG. 5 may be attached to the bifurcated holder 6 employed in FIGS. 1 and 2 and in such a case it is necessary to make this bearing pivotally adjustable about the center point M. For this purpose and as shown in FIG. 5 the bearing 58 is attached to a ring-shaped segment 59 which can be slidably adjusted in curved guides 60, 61 extending concentrically to the segment 59 and then locked in position after adjustment.

The FIGS. 7 to 13 inclusive illustrate a constructional embodiment of the device shown diagrammatically in the FIGS. 4, 5 and 6.

Referring first to FIG. 6, the same shows diagrammatically the addendum envelope 65 of the movable cutting edge after the cutting blade has performed a complete revolution about the axis of the shaft 2. This envelope 65 corresponds approximately to a twisted surface of a frusto-concial envelope. The points 63 indicate the reversing points of the envelope prescribed by the curved cutting edge 65 and in which the cutting blade 34 changes from a left hand pitch to a right hand pitch. The cutting tube 51 through which the cigarette rod 49 passes is arranged on that point of the envelope 65 where this envelope has the greatest slope angle. A change of the slope angle at this point may be disregarded when the cutting blade is plane, because at this point there exists a dead center position. The envelope 65 is so arranged with respect to the axis of the cutting tube 51 that the mentioned dead center position coincides with the axis 64 of the cutting tube 51. In this position the cutting blade 34 is positioned at right angles with respect to the cigarette rod 49 as required. The variations in inclination to both sides of this dead center position during the engagement of the cutting blade 34 with the cutting tube 51 are negligible. By a correction of the position of the axis of the cutting blade 34 toward the direction of the greatest radius of the curved blade any existing error during the cutting may be reduced still more.

During the movement of the cigarette rod 49 in the direction of the arrow 66a it is advisable that the plane face 67 of the cutting blade 34 engages the end face 68 of the cutting tube 51. When the position of the cutting blade 34 is reversed so that its bevel will engage the end face 68 of the cutting tube 51, then there will occur a certain squeezing action (see FIG. 7). The same arrangement between the plane face 67 of the cutting blade 34 and the end face 68 of the cutting tube 51 may also be provided with reference to the other side of the cutting tube 51. In this case, however, the bevel would be provided on the other side of the cutting blade 34. It is, however, not desirable to permit the blade to cooperate with the other cutting tube half since this other part of the cutting tube has a larger diameter than the cigarette rod so that in such a case the possibility of a squeezing of the cigarette rod is present.

The desired arrangeemnt of the plane surface 67 of the cutting blade 34 makes it advisable to arrange the grinding disc 9 above the reversing points 63 of the envelope 65—looking in the direction of rotation of the blade 34—namely in the theoretical range 69. The distance of the grinding disc axis from the reversing points 63 should be at least equal to the radius of the grinding disc 9 in order that the outer ranges of the grinding disc 9 do not extend into the range of the other pitch. Furthermore, it is required to arrange the honing disc 11 in front of the cutting tube 51 with reference to the rotation of the cutting blade 34. Since further the honing disc 11 and the grinding disc 9 should be arranged diametrically opposite to one another in order to prevent the production of a bevel, it follows from FIG. 6 that the grinding disc 9 should be arranged as shown with reference to the envelope 65. In this particular position of the grinding disc the cutting blade 34 will receive a predetermined curved shape. If this curved shape is to be changed, then it is necessary to readjust not only the grinding disc 9, but also the honing disc 11 within a range between the illustrated position and a point closer to the reversing point 63. Therefore, one is able to adjust the desired or required pitch of the curved cutting blade 34.

Figure 8:
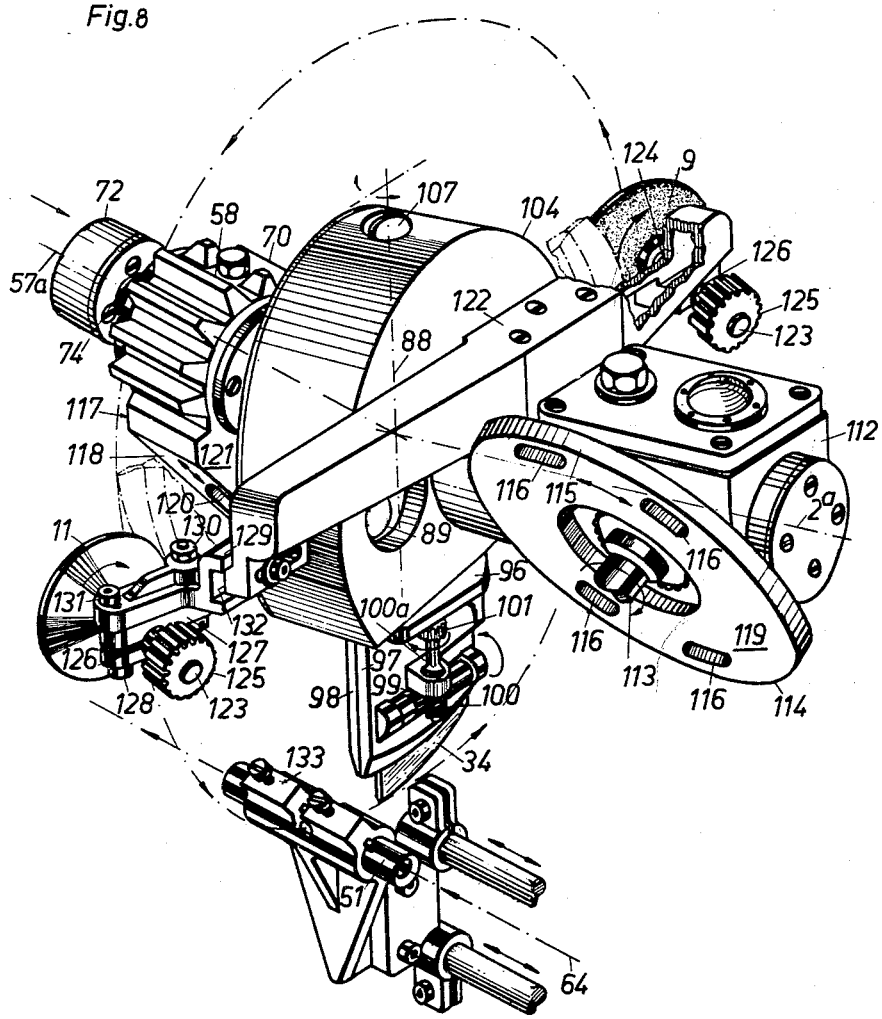
FIG. 8 is a perspective view of the cutting device.

FIG. 8 illustrates a practical example of the same cutting device which is illustrated diagrammatically in the FIGS. 4–6. The same parts are designated by the same reference numerals. The axis of the cutting blade carrier shaft 2 is designated with 2a and the axis of the pivot pin 57 which supports the cutting blade 34 is designated with 57a. The pivot pin 57 (FIG. 9) is rotatably supported in a bearing 58 which is provided on its exterior with cooling fins 70 (FIG. 8) for dissipating heat which develops at high revolutions. The cutting device in a present day cigarette making machine operates at a speed up to 1500 r.p.m. and at such a speed the cooling fins 70 are not required. However, tests have shown that the cutting device is able to operate successfully at speerds up to 3000 r.p.m. and at those speeds the cooling fins are recommended.

The pivot pin 57 carries the fork 54 as shown in FIG. 9. In fact, the pivot pin 57 and the fork 54 are rigidly connected with each other or may be made of one single piece. The pivot pin 57 is tubular and supports in its bore and axially slidable bolt 71. This axially slidable bolt 71 is used for a re-adjustment of the cutting blade 34. For this purpose the bolt is provided on its outer end with an operating button 72 which by means of a bearing 73 is rotatably attached to the end of the bolt 71. By means of a compressed spring 74 the bolt 71 is normally urged outwardly. The axial outward movement of the bolt 71 is limited by a jaw mounting 76 which is attached to the other end of the bolt 71 by a screw 75.

In the illustrated position the operating button 72 is subjected to pressure. The bolt 71 is provided with a face 77 which is engaged by a guide member 79 attached to the fork 54 by a screw 78. This guide member 79 prevents a rotation of the bolt 71. The jaw mounting 76 is provided with a projection 80 having a bore therein. A locking pawl 82 engages with its lever-like portion 81 the projection 80. A bolt 83 passes through bores 84 in the lever-like portion of the locking pawl 82 and through the bore in the projection 80 and is locked against axial displacement. A leaf spring 85 which is secured to the projection 80 engages the locking pawl 82 and urges the latter into engagement with ratchet teeth 86 (FIG. 13) arranged on the cutting blade adjusting shaft 87 which is rotatably mounted in a tubular cutting blade carrying shaft 88. The pitch of the ratchet teeth 86 is greater than the oscillating path of the shaft 88 so that any accidental adjustment is prevented. When selecting a suitably large step-down ratio of the intermediate gearings which operate the cuting blade adjusting shaft 87, then one could employ a stationary pawl and could omit the adjusting mechanism for this pawl. The ends 89 of the fork 54 are provided—as shown in section in FIG. 9—each with a bearing 90 which rotatably support pivot pins 53 which in turn extend into the bores 55 and 56 (FIG. 11) of the ring 30 and are secured to this ring by nuts 91 (FIG. 13). At right angles to these bores there are provided in the ring 30 additional axially aligned bores 93 which are arranged in the same plane as the axis of the bores 55 and 56. The tubular blade carrying shaft 88 extends through these bores 93 and is attached to the slotted ring 30 by clamping bolts 94. The ring 30 has slots 92 extending parallel to its end faces. One end of this shaft 88 is provided with a flange 95 to which is attached the holder 96 for the cutting blade 34. The holder 96 is provided for this purpose with an angular support plate 97 for the blade 34 proper. A counterplate 98 forms with the plate 97 a guide channel for the cutting blade 34. Both plates 97 and 98 have mounted thereon rotatable rollers between which the cutting blade 34 is clamped in position. One of the rollers has teeth 99 engaged by a worm gear 100 on a shaft 100a carrying a gear 101 meshing with a gear 102 as shown in FIG. 13. The gear 102 is mounted on the cutting blade adjusting shaft 87. At the other end of the tubular cutting blade carrying shaft 88 is mounted a cap 103 provided in its center with a recessed ball seat 105. This recess 105 receives, as shown in FIGS. 12 and 13, a ball 106 which in turn is engaged by a pressure screw 107 which is adjustable in the blade carrier 104.

FIG. 12 shows the particular construction of the bearings 107 and 108. Any axial pressures are taken up by the pressure bearing 109 which permits a playless adjustment of the shaft 88 by means of the pressure screw 107. The blade carrying shaft 2 (FIG. 1) engages a conical bore 111 provided in the blade carrier 104 which is fixedly attached in this conical bore 111. The shaft 2 which is indicated in FIG. 8 only by its center axis 2a is rotatably supported in a gear box 112. A shaft 113 which is driven in any desired manner from the main drive shaft of the machine rotates the shaft 2 by means of intermediate gears. On the gear box 112 is arranged a flange 114 which forms an inclination with respect to the horizontal plane. This flange 114 is provided with a graduation 115 for permitting an adjustment of the device to the desired length of cigarettes to be cut from the cigarette rod. The adjusted value is readable on a mark arranged on the not illustrated housing of the machine. The required rotatable adjustment of the flange 114 with respect to the housing is made possible by curved slots 116 which are provided in the flange 114. For the purpose of adjusting the cutting device to a different cigarette length, there is effected not only a loosening of the clamping screws for the flange 114, but also a loosening of the clamping screws for the bearing 58. This bearing 58 is mounted on a bearing block 117 (FIG. 13). The clamping face 118 of the bearing block 117 and the clamping face 119 (FIG. 8) of the flange 114 are arranged in parallel planes. The illustrated slots 120 in the bearing block 117 permit an adjustment of the position of the bearing 58. This adjustment is necessary, because when the flange 114 is rotatably adjusted, the point of intersection of the axis 2a of the shaft 2, the pivot pins 57 and the tubular cutting blade shaft 88 are displaced within the plane of the cutting blade carrier 104. After the adjustment has been completed, the flange 114 and the bearing block 117 are again clamped and locked in their adjusted position. This adjustment has the advantage that the required angular position of the shaft 2 with respect to the pivot pin 57 is automatically accomplished. In this connection it is also of advantage when the side walls 121 of the bearing block 117 are arranged between parallel guides instead of employing the slots 120, because parallel guides prevent a lateral shifting.

As shown in FIG. 8, the carrier 122 for the two rotatable discs 9 and 11 is mounted on the gear box 112. The discs 9 and 11 are arranged with their operating faces which engage the cutting blade opposite one another and for this purpose are attached by means of sleeves 124 to shafts 123. On the free ends of the shafts 123 are mounted manually rotatable buttons 125 which permit a rotating of the discs 9 and 11 to test whether the same will engage the cutting blade 34 correctly. The shafts 123 are rotatable in bushings 126 which in turn are axially adjustably mounted in a slotted bore of holders 127. A clamping screw 128 permits a locking of the bushing in the desired axial position. Each disc holder 127 for the purpose of conforming to the shape of the envelope 60 is mounted on a carrier extension 129 by means of bolts 130 and 131. The adjustment is accomplished in a horizontal direction. An additional adjustment in longitudinal direction of the carrier 122 is possible by the provision of a parallel guide 132 which permits an adjustment of the carrier extension 129 with respect to the cutting circle. The cutting tube 51 is arranged in customary manner on a holder 133 which permits a longitudinal adjustment of the cutting tube 51 in both directions.

The operation of this device with particular reference to FIG. 6 is as follows:

The carrier 104 with the cutting blade 34 thereon makes one revolution for each movement of the cigarette rod about the length of one cigarette. When the cutting blade 34 passes the cutting tube 51, the speed of the cutting blade is approximately the same as the speed with which the cigarette rod is moved. After the cigarette rod has been cut, the pitch of the cutting blade is reversed after it has passed the reversing point 63 and then reaches the desired inclination necessary for grinding the bevel and the curved shape of the cutting edge 62. The individual points of the cutting edge are moved one after the other along the grinding line on the grinding disc and this causes a rotation of the grinding disc about its own axis. Contrary to other known devices in which the cutting edge is ground by the edge of the grinding disc, in the device of the present invention the grinding takes place only by the surface of the grinding disc 9 so that the wear of the grinding disc is substantially reduced and at the same time a better sharpness of the cutting edge is obtained. After the cutting edge 62 has been ground in this manner, the pitch of the cutting blade 34, after passing through the other reversing points 63, is again reversed so that the honing surface of the honing disc 11 engages the bevel-less plane face 67 of the cutting blade 34 and removes any burr. The diagrammatical arrangement of the grinding disc 9 with respect to the honing disc 11 assures that only the burr is removed while the ground curved shape of the cutting blade is not changed at all. The cutting blade 34 which during one revolution has been ground and honed, will now again in the desired manner reach the maximum pitch of the envelope 65 within the range of the cutting tube 51. The gap of tooth of the teeth 86 (FIG. 13) is greater then the movement of the locking pawl 82 by oscillating.

The cutting device of the invention can be used in all machines in which are cut wrapped or not wrapped tobacco rod.

What I claim is:

1. In a cutting device for cigarette rod making machines, a driven shaft, a hollow carrier mounted on said shaft for rotation therewith and having a radial bore, a pivot pin rotatably mounted in the bore of said carrier to be rotatably adjustable about the axis thereof, a curved cutting blade carried by said pivot pin, and means located within said carrier and operatively engaging said pin for oscillating said cutting blade about the axis of said pivot pin in response to rotation of said carrier.

2. In a cutting device for cigarette rod making machines, a driven shaft, a carrier mounted on said shaft for rotation therewith and having a radial bore, a pivot pin rotatably mounted in the bore of said carrier to be rotatably adjustable about the axis thereof, a cutting blade having a curved cutting edge and being carried by said pivot pin, actuating means located in said carrier and operatively engaging said pin for oscillating said cutting blade about the axis of said pivot pin in response to rotation of said carrier, a stationary grinding tool, and a stationary honing tool, said tools being mounted in the path of movement of said curved cutting blade and said actuating means being arranged to oscillate said blade to and fro in response to rotation of said carrier to align said cutting edge with said tools.

3. In a cutting device for cigarette rod making machines, a driven shaft, a hollow carrier mounted on said shaft for rotation therewith and having a central cavity, said carrier further having aligned radial bores communicating with said cavity, two axially aligned pivot pins rotatably mounted in the bores of said carrier for rotative adjustment along a diametrically extending axis, a circular member arranged within said cavity and fixedly attached to the inner ends of said axially aligned pivot pins, a holder attached to the outer end of one of said two axially aligned pivot pins, a curved cutting blade mounted on said holder, actuating means for oscillating said circular member so that said cutting blade will be rocked to and fro about the common axis of said two axially aligned pivot pins in response to rotation of said carrier, a stationary grinding tool and a stationary honing tool, and stationary mounting means for both of said tools to support the same in the path of movement of said curved cutting blade.

4. In a cutting device for cigarette rod making machines, a driven shaft, a carrier mounted on said shaft and having a central cavity, two axially aligned pivot pins mounted in said carrier for rotative adjustment along a diametrically extending axis, a circular member arranged within said cavity and fixedly attached to the inner ends of said pivot pins, a holder attached to the outer end of one of said pivot pins, a curved cutting blade mounted on said holder, means for oscillating said cutting blade with its holder in said carrier about the common axis of said pivot pins, a stationary grinding tool and a stationary honing tool, stationary means supporting both said tools in the path of movement of said cutting blade, a cam arranged within the opening in said circular member, and two guide rollers mounted on said circular member and engaging the opposite sides of said cam, said cam being in axial alignment with said driven shaft.

5. In a cutting device according to claim 4, a tubular spindle attached to said cam and in axial alignment with said driven shaft, and a casing in which both said driven shaft and said tubular spindle are mounted.

6. In a cutting device according to claim 4, a tubular spindle attached to said cam and in axial alignment with said driven shaft, a casing in which both said driven shaft and said tubular spindle are mounted, adjusting means for said cutting blade mounted on said spindle, and a manually operable rod mounted within said spindle for operating said adjusting means.

7. In a cutting device for cigarette rod making machines, a driven shaft, a carrier mounted on said shaft for rotation therewith and having a central cavity, two axially aligned pivot pins mounted in said carrier for rotative adjustment along a diametrically extending axis, a circular member arranged within said cavity and fixedly attached to the inner ends of said pivot pins, means for pivotally supporting and adjusting said circular member about an axis extending at right angles to the axis of said pivot pins, a holder attached to the outer end of one of said pivot pins, a curved cutting blade mounted on said holder, means for oscillating said cutting blade and said holder about the common axis of said pivot pins in response to rotation of said carrier, a stationary grinding tool, a stationary honing tool, and stationary mounting means for supporting said tools in the path of movement of said cutting blade.

8. In a cutting device for cigarette rod making machines, a driven shaft, a carrier mounted on said shaft for rotation therewith and having a central cavity, two axially aligned pivot pins mounted in said carrier for rotative adjustment along a diametrically extending axis, a circular member arranged within said cavity and fixedly attached to the inner ends of said pivot pins, means for pivotally supporting and adjusting said circular member about an axis extending at right angles to the axis of said pivot pins, a holder attached to the outer end of one of said pivot pins, a curved cutting blade mounted on said holder, means for oscillating said cutting blade and said holder about the common axis of said pivot pins in response to rotation of said carrier, a stationary grinding tool, a stationary honing tool, and stationary mounting means for supporting said tools in the path of movement of said cutting blade, said means for pivotally supporting and adjusting said circular member comprising two additional pivot pins, a fork having arms provided with bearings for said additional pivot pins, a further pivot pin extending outwardly from the central portion of said fork and a bearing rotatably receiving said further pivot pin and having an axis which makes an acute angle with the axis of said driven shaft.

9. In a cutting device for cigarette rod making machines, a driven shaft, a carrier mounted on said shaft for rotation therewith and having a central cavity in said cutter blade carrier, two axially aligned pivot pins mounted in said carrier for rotative adjustment along a diametrically extending axis, a circular member arranged within said cavity and fixedly attached to the inner ends of said pivot pins, means for pivotally supporting and adjusting said circular member about an axis extending at right angles to the axis of said pivot pins, a holder attached to the outer end of one of said pivot pins, a curved cutting blade mounted on said holder, means for oscillating said cutting blade and said holder about the common axis of said pivot pins in response to rotation of said carrier, a stationary grinding tool, a stationary honing tool, stationary mounting means for supporting said tools in the path of movement of said cutting blade, said means for pivotally supporting and adjusting said circular member comprising two additional pivot pins, a fork having two arms provided with bearings for said additional pivot pins, a further pivot pin extending outwardly from the central portion of said fork, a bearing rotatably supporting said further pivot pin and having an axis which makes an acute angle with the axis of said driven shaft, and means for adjusting said bearing for changing the magnitude of said angle.

10. In a cutting device for cigarette rod making machines, a driven shaft, a carrier mounted on said shaft for rotation therewith and having a central cavity, a pivot pin mounted in said carrier for rotative adjustment along a radially extending axis, a circular member arranged within said cavity and fixedly attached to the inner end of said pivot pin, means for pivotally supporting and adjusting said circular member about an axis extending at right angles to the axis of said pivot pin, a holder attached to the outer end of said pivot pin, a curved cutting blade mounted on said holder, means for oscillating said cutting blade and said holder about the axis of said pivot pin in response to rotation of said carrier, a stationary grinding tool, a stationary honing tool, and stationary mounting means for supporting said tools in the path of movement of said cutting blade.

11. In a cutting device for use in cigarette rod making machines and the like, in combination, a driven shaft; carrier means fixedly secured to and arranged to rotate with said shaft; a pivot member rotatably supported by said carrier means and extending substantially radially with reference to said shaft; a cutting blade secured to said pivot member so as to orbit about said shaft in response to rotation of said carrier means, said blade having a cutting edge which crosses in space the axis of said pivot member; and means for oscillating said blade about the axis of said pivot member in response to rotation of said carrier means so that the cutting edge wobbles while the blade orbits about said shaft.

12. In a cutting device for use in cigarette rod making machines and the like, in combination, a driven shaft; carrier means fixedly secured to and arranged to rotate with said shaft; a pivot member rotatably supported by said carrier means and extending substantially radially with reference to said shaft; a cutting blade secured to said pivot member so as to orbit about said shaft in response to rotation of said carrier means; and means for oscillating said blade about the axis of said pivot member in response to rotation of said carrier means so that the cutting edge wobbles while the blade orbits about said shaft and describes an addendum envelope with two reversing points located diametrically opposite each other.

13. A structure as set forth in claim 12, further comprising a sharpening tool spaced from said reversing points and fixedly mounted in the path of said blade so as to treat the same when said shaft rotates.

References Cited by the Examiner
UNITED STATES PATENTS

| 1,846,807 | 2/32 | Hohn | 51—247 |
| 2,139,100 | 12/38 | Ruau | 83—314 |
| 2,554,027 | 5/51 | Haswell | 83—497 |
| 2,752,741 | 7/56 | Molins | 83—174 |

ANDREW R. JUHASZ, *Primary Examiner.*

CARL W. TOMLIN, EDWARD C. ALLEN, *Examiners.*

UNITED STATES PATENT OFFICE
CERTIFICATE OF CORRECTION

Patent No. 3,176,560                              April 6, 1965

Dietrich Bardenhagen

It is hereby certified that error appears in the above numbered patent requiring correction and that the said Letters Patent should read as corrected below.

In the heading to the printed specification, line 10, for "Nov. 29, 1960" read -- Feb. 26, 1960 --.

Signed and sealed this 22nd day of February 1966.

(SEAL)
Attest:

ERNEST W. SWIDER                                      EDWARD J. BRENNER
Attesting Officer                                            Commissioner of Patents